W. L. MORRIS.
OIL DRYING APPARATUS.
APPLICATION FILED SEPT. 25, 1911.
1,066,644.
Patented July 8, 1913.
2 SHEETS—SHEET 1.
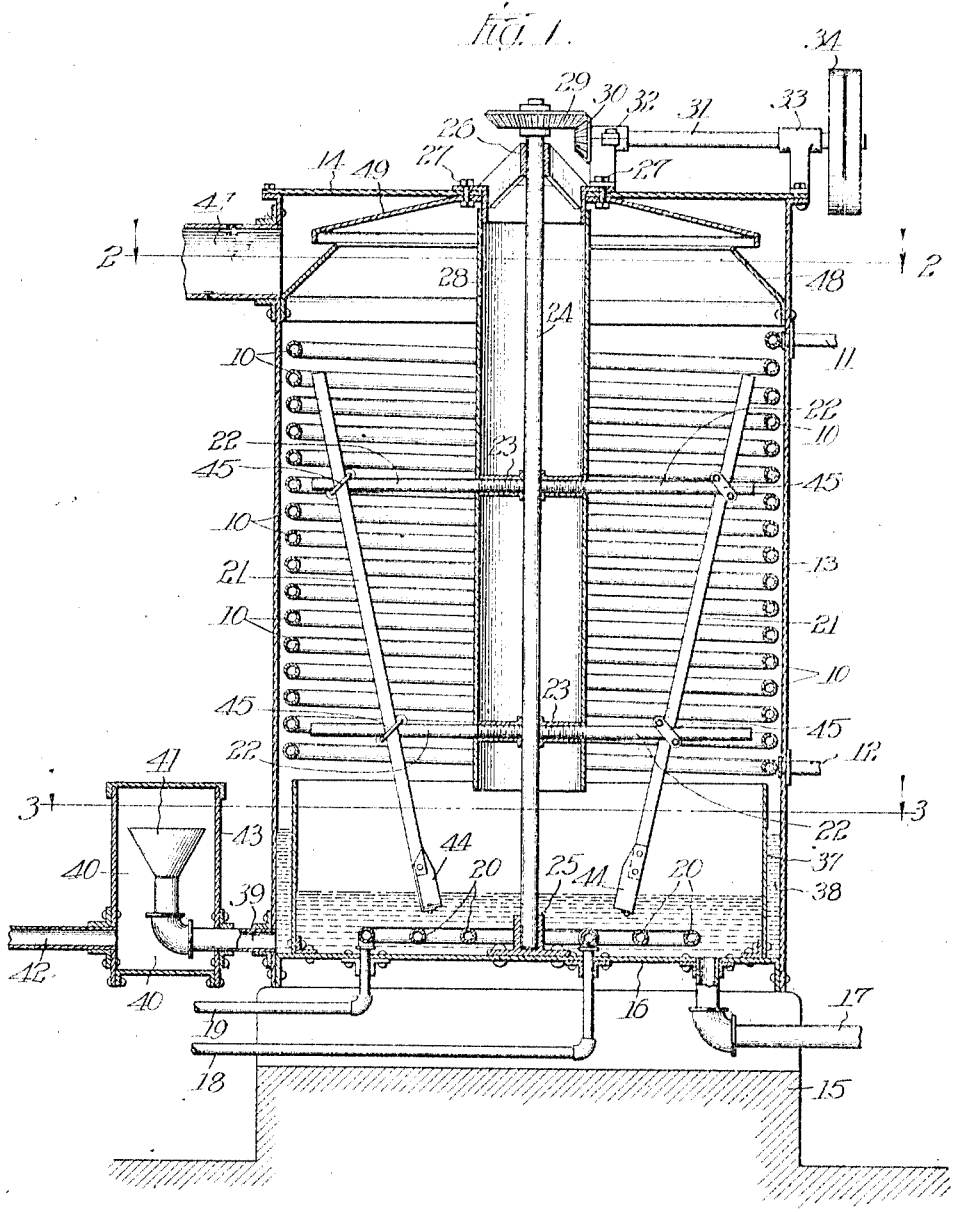

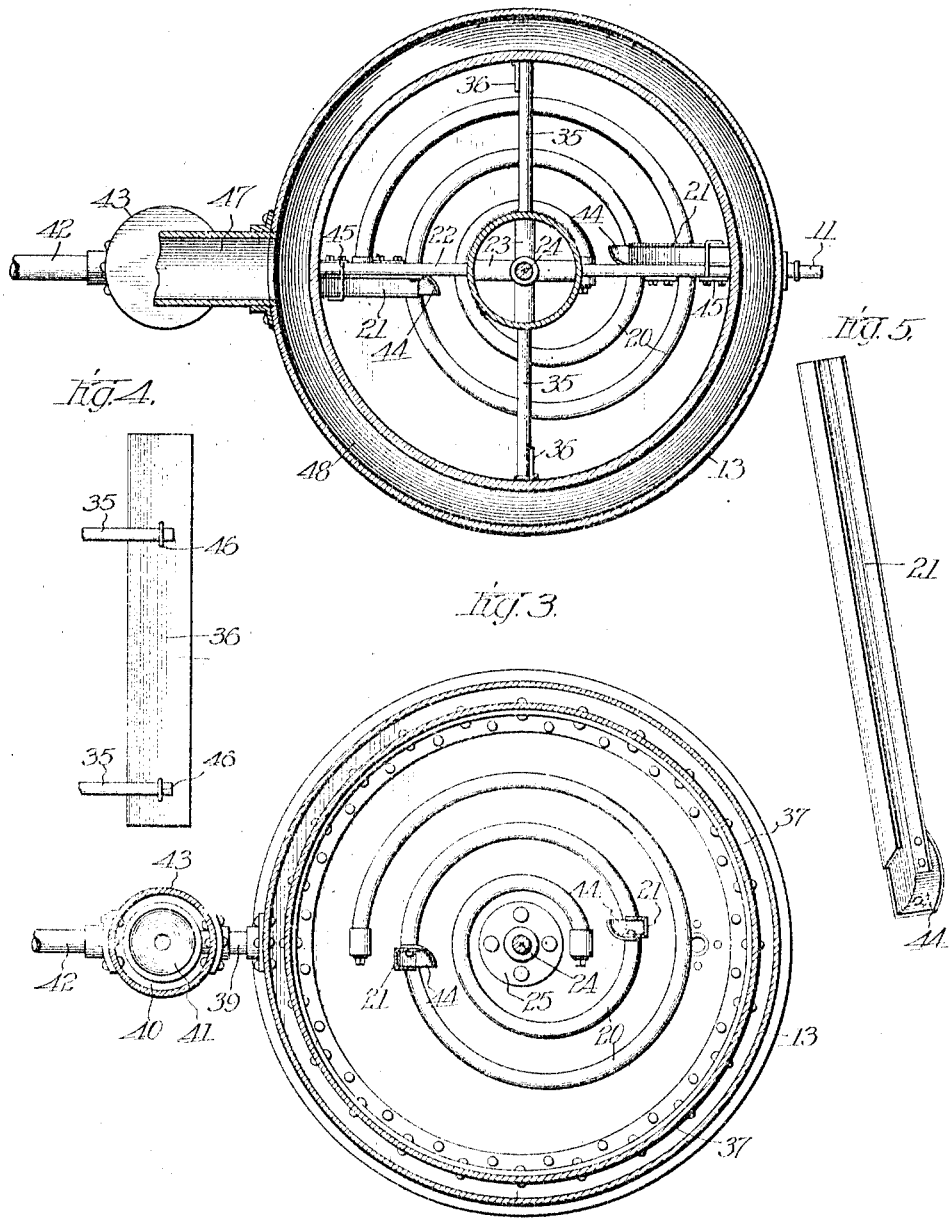

UNITED STATES PATENT OFFICE.

WILLIAM L. MORRIS, OF FORT WAYNE, INDIANA, ASSIGNOR TO S. F. BOWSER & CO., INC., OF FORT WAYNE, INDIANA, A CORPORATION OF INDIANA.

OIL-DRYING APPARATUS.

1,066,644.

Specification of Letters Patent.   Patented July 8, 1913.

Application filed September 25, 1911.   Serial No. 651,083.

*To all whom it may concern:*

Be it known that I, WILLIAM L. MORRIS, a citizen of the United States, residing at Fort Wayne, in the county of Allen and State of Indiana, have invented certain new and useful Improvements in Oil-Drying Apparatus, of which the following is a specification.

The invention relates to improved apparatus for removing water from oil which carries animal fats.

The invention is more particularly adapted for removing the moisture contained in the froth, foam, suds or other styled conditions of oil which contains animal fat, water and air, all expanded into a light foam.

Conditions, productive of mixtures requiring the use of any improved oil drying apparatus in which it is particularly desired to remove water from oil containing animal fat, such as lard oil, are found around machines using cutting oils upon tools where water is brought in contact with the oil. Under conditions where mineral oil and water are to be separated the water and oil would ordinarily be raised in temperature to a degree where water would be transformed into steam and carried away. My improved device serves an entirely different purpose and is entirely unlike an ordinary evaporator. Under the conditions attendant upon the use of my improved device the mingled animal fats, water and oil expand into froth or foam at about 180° temperature Fahr., and the entire mass of fluid goes into this state long before the water will vaporize which will take place about 212° Fahr. When the mingled oil, animal fat and water have been turned into this state in my improved device by the application of heat it becomes a poor transmitter of heat and the tendency is to continue to expand into still lighter foam. The problem is not to remove moisture from the liquid as it will not stay in liquid form, but to remove moisture from the froth or foam.

The object of the invention is to provide certain new and useful improvements in oil drying apparatus of the described character as hereinafter set forth and claimed.

It is found that when froth or foam consisting of water, oil and animal fat is brought in contact with a hot surface steam is liberated and by its expansion drives ahead of it such of the mixture as may be in its path.

A further object of the invention is to provide improved means for keeping the foam or froth closely against a hot surface in a thin sheet in order that the steam or moisture may escape freely from the mixture and be liberated from the animal fat and oil.

A further object of the invention is to provide improved means for carrying the steam vapor out of contact with the foam or froth as soon as it is liberated therefrom comprising an improved arrangement of air passages adapted to carry the vapor by means of currents of air which circulate past the aforesaid hot surfaces which are throwing off vapor from the mixture presented to the same.

The preferred embodiment of the invention is illustrated in the drawings which form a part of the specification and of which—

Figure 1 is a vertical sectional view; Fig. 2 is a horizontal section on line 2—2 of Fig. 1 looking downwardly; Fig. 3 is a similar sectional view looking in the same direction on the line 3—3 of the same figure; and Figs. 4 and 5 are enlarged detail views of parts hereinafter referred to and described.

When it is desired to remove water from a mixture of oil and animal fat I have ascertained by experiment when the mingled materials in the form of suds or foam are presented to a heated metallic surface under the impelling force of an air blast or air current that the air will not only carry the steam along with it but due to its becoming heated it is susceptible of carrying moisture independently of steam evaporation. The expanded condition of the foam is governed by its temperature. Water, oil and animal fat in the form of suds or foam may be brought in contact with a very hot surface, one which is sufficiently hot to evaporize the water, and the foam or suds will immediately start to sputter and expand to throw off steam, and will then contract back to solid oil when all the water is driven off. My improved device is adapted to carry the dried oil out of the path of the incoming foam or suds so that if any of the same remains on the hot surface it will be returned back to it and the oil which has been freed of moisture will be diverted out of the path of the further progress of the suds or foam.

As a hot surface over which to pass the foam or froth composed of water, oil and animal fat, I prefer a steam coil preferably of cylindrical form as indicated by the reference character 10. This coil may be arranged in any desired manner, although it is preferred that the coil extend vertically as illustrated. Steam to the coil 10 is admitted and discharged through the nipples 11, 12, respectively, which have suitable connections with feed and exhaust pipes not herein shown since the same forms no part of the invention. The steam coil nipples 11, 12, extend through the walls of a cylindrical casing indicated by the reference character 13 which supports the coil and like the same extends vertically although not necessarily so, since it has been found by experiment that the invention may be practised by the drying coil in horizontal instead of vertical arrangement. It is desirable that the coil or other heated surface and the casing such as the casing 13 supporting the same shall be of sufficient length to insure that all water has been evaporated by the time that the mixture of froth or foam containing water, oil or animal fats has been evaporated before such mixture reaches the end of the apparatus opposite that where it is admitted to be carried through the apparatus by the blast or current of air. In the embodiment of the invention illustrated the upper extremity of the cylindrical supporting casing 13 is closed by a circular top plate 14 secured to the flanged upper extremity of the casing by suitable retaining bolts, both bolts and flanges being shown but not indicated by reference characters as the same indicate one mode of fastening the parts together and constitute no part of the invention. The entire device may be supported by any suitable foundation, one form being illustrated as made of suitable material as masonry or concrete and indicated by the reference character 15. The casing 13 is closed by a suitable bottom plate 16 which is flanged preferably as illustrated and secured to the lower extremity of the casing 13 by rivets or other suitable means, the said flange and rivets being illustrated in Fig. 1 but not designated by reference characters since this detail of construction forms no part of the invention. The bottom plate 16 of the casing is pierced to provide an opening and support for the discharge end of the feed pipe 17 through which the mixed material of water, oil and animal fat is admitted to the apparatus. Other openings in the bottom plate 16 receive and support the intake and discharge steam pipes 18, 19, which are connected with the coil 20 at the bottom of the apparatus just above the bottom plate 16. The bottom steam coil being heated in the manner shown and described to a temperature sufficient to cause the incoming mixture of water, oil and animal fats to expand into froth or foam but not being sufficiently hot to immediately vaporize the water, the mixture is ready to be submitted to the heated vertically extending coils 10, preferably in the form of a thin film. This is accomplished preferably by a revolving conveyer comprising one or more channeled members as indicated by the reference character 21 secured to supporting arms 22 of which there are preferably two to each channeled conveyer radiating from suitable spiders 23 which are provided with hub portions being spaced apart and sleeved upon vertical central shaft 24 rotatably journaled in bearing block 25 at its lower extremity which bearing is secured to bottom plate 16 on the upper side thereof. At its upper extremity the vertical central shaft 24 passes through an opening in top plate 14 and is rotatably supported by a bearing member 26 in the form of a spider having radiating arms which extend from the bearing portion a sufficient distance to engage the top plate 14 where these arms are secured to the plate by suitable retaining means as bolts 27. The bearing spider 26 is preferably provided around the peripheral portion at the extremities of the radial arms with a flange, one member of which extends horizontally and another circumferential branch of the same extends downward vertically beyond the central opening in top plate 14 as illustrated in Fig. 1 to form an air closure for the inner upper extremity of the central tube or air passage 28 which is rotatably supported or carried by spiders 23 on central shaft 24. The tubular member 28 being provided with an unobstructed longitudinal opening from the exterior of the casing at the top thereof to the interior just above the bottom steam coil 20 save for the slight obstructions due to the necessary interposition of the top supporting spider 26 of the central shaft and the supporting spiders 23 for the channeled conveyers. Rotation may be imparted to the central shaft 24 by any desired means, that preferred being the bevel gears 29, 30, the former of which is fixed to the upper extremity of the vertical shaft and the latter meshing therewith and secured to the inner extremity of shaft 31 which is supported by suitable bearings 32, 33, secured to the upper extremity of the casing and extending beyond the outer periphery of the same and being provided with driving pulley 34 or other suitable means for imparting rotation to the said shaft. In order that the spiders 23 carrying the channeled conveyers may be secured to rotate with central shaft 24 it is preferred that the radiating openings in the spiders 23 extend through to the central opening or hub for the central shaft and be threaded to receive the threaded inner ends of the supporting arms 22 which may be screwed to bind upon the central shaft and thus lock the spiders in fixed relation to the shaft. The spiders 23 are each provided with one or more similar radial housings or openings which are also threaded and adapted to receive radial arms as indicated by the reference character 35 to the outer extremities of which adjacent the steam coil 10 are secured one or more fan vanes 36. Two of such vanes are shown in the embodiment of the invention illustrated.

On its upper surface the bottom plate 16 has secured thereto a peripheral flange of considerable height preferably extending almost to the lower extremity of the steam coil 10 and adjacent the lower extremity of the tubular member 28 as indicated by the reference character 37. The circular flanged member 37 forms a closed receptacle around the lower coil 20, the walls of the same being spaced some distance apart from the inner surface of the outer casing 13 so that a peripheral passage between the outer casing and the wall 37 is provided as indicated by the reference character 38. The lower extremities of the channeled conveyers 21 dip into the material entering the lower extremity of the device on the interior of the upwardly opening closure formed by the flange 37 which owing to their peculiar shape at their lower extremities are adapted to pick up the froth or foam adjacent the lower steam coil at the bottom of the device and because of the fact that they are being rapidly rotated around the central shaft the materials from above the lower coil at the bottom of the device will be carried to the upper extremities of these members and discharged outwardly against the heated steam coil 10 adjacent the upper extremity thereof and in a thin film which by gravity will be caused to travel downwardly throughout the length of the heated coil. It is during this downward travel of the materials after leaving the conveyers that the drying of the oil and the separation of the materials is accomplished. The dry oil dropping from the coils 10 passes into the peripheral opening 38 between the casing 13 and the inner flanged member 37 thence outwardly through pipe 39 into the chamber 40 past overflow 41 and thence through discharge pipe 42 to any desired source for collecting the dry oil. The chamber 40 is formed by the cylindrical enlargement 43 interposed between pipes 39 and 42 and need not be constructed in the precise form illustrated although the form shown is preferred. The elevation of the overflow 41 insures that the dry oil shall be retained within the peripheral chamber 38 at the bottom of the casing to a predetermined height effectively sealing the casing against the escape of any froth or foam, such foam being lighter and free to fall over the top edge of 37 back into base of drier.

In order that the channeled conveyers 21 may be effective to elevate the material from the bottom of the device to the upper extremity of the coil, the open or channel side of these members each preferably faces the central shaft 24 and the members are so secured to the radial arms 22 as to converge downwardly toward the center of the casing to a point immediately above the steam coils 20 and having their upper or discharge extremities adjacent the peripheral coils 10 at the top side thereof. The channel conveyers 21 are provided with spoon-shaped receiving members 44 at their lower extremities which open in the direction of rotation of the conveyers enabling the same to pick up the materials from above the coils at the bottom of the device and deflect the same into the channel to be discharged at the upper extremities of the coils 10. The channel conveyers 21 may be secured to arms 22 by any suitable means as the U-bolts and clamps indicated at 45 while similar means, as indicated at 46, may be employed for securing the vanes 36 to the radial arms 35.

Adjacent the top of the casing 13 is the lateral discharge outlet 47 through which is adapted to be passed the escaping air, vapor and condensation. Collection of condensation and the direction of the same to the discharge passage 47 is facilitated by means of the circumferential flange 48 which is secured to the interior of the casing 13 and with the wall of the casing forms a trough around the inner periphery of the casing, the outlet of which is through the discharge opening 47. To prevent water vapors condensing upon top plate 14 and dropping back into oil a circular conical shaped plate 49 is secured to the upper or top member 14 of the casing by the retaining bolts 27, this plate being pierced at the center to surround the downwardly extending flange of the bearing member 26 which supports the central shaft 24.

The operation of the device is as follows: The bottom coil 20 being heated by the circulation through the same of steam passing through supply and exhaust pipes 18, 19 and the vertically extending coil 10 also being heated by the circulation of live steam through supply and exhaust pipes 11, 12, the mixture containing oil to be dried is admitted through intake pipe 17 into the compartment open at the top around the steam coil 20, where if not already expanded the material will pass into a condition of froth and foam and will be elevated by the rapidly rotating channel conveyers 21 by reason of their scoop-shaped lower projections 44.

From these conveyers the material from the bottom of the device will be fed in a thin film around the upper extremity of the vertical coil 10 which being a hot surface will liberate the moisture or water of the mixture in the form of steam which will escape upwardly between flanges of plates 48 and 49 and out discharge pipe 47. The material containing oil and animal fat will continue to pass downwardly past the coils 10 and any further water will tend to be evaporated before the animal fats or oil mingled with animal fats reaches the bottom coil and passes into the peripheral opening 38 around the bottom of the casing; the liquid oil which is free from water would be discharged through the overflow 41 and the oil discharge pipe 42. Any foam that passes the coil 10 and reaches the dry oil collector 38 is allowed to overflow back into base of drier and be returned to drying coil. Evaporation of moisture from the materials passing downwardly over the coils is greatly facilitated by reason of the provision made for the passage of an air current or blast through the device, such a current being largely induced by the rapid rotation of the fan vanes 36 as well as the channel conveyers or elevators 21, the air entering in a well known manner through the openings in the spider bearing 26 in the top of the device passing thence downwardly through the central air tube 28 which rotates with central shaft 24, being thence deflected upwardly over heated coils 20 and inwardly between flanged members 48, 49 and thence outward through discharge pipe 47, the current carrying with it moisture in the form of vapor or in a condensed form as explained. By reason of the above arrangement of the parts of the device it will be seen that the dried oil will pass outwardly beyond the coils so that there will be no mixing of the dry oil with the incoming raw materials.

In order that the invention might be fully understood, the details of the preferred embodiment thereof have been specifically shown and described but it will be apparent that there may be many modifications and arrangements of various parts made by those skilled in the art without departing from the purpose and spirit of the invention.

I claim:

1. In an oil drying apparatus, the combination with a closed casing provided with an inner heated surface, there being an inlet for the materials to be dried and an outlet for vapor and condensation in said casing, means for discharging the dried oil from the casing, and means for presenting the incoming material to the heated surface comprising a rotating conveyer adapted to lift the incoming material from the bottom of the casing and present the same in a thin film to the heated surface adjacent the top thereof.

2. In an oil drying apparatus, the combination with a closed casing being provided with an inner heated surface around the vertical sides thereof, an inlet for the materials to be dried, an outlet for vapor and condensation, means for discharging the dried oil, and means for presenting the incoming material to the heated surface adjacent the topmost portion thereof comprising a conveyer blade adapted to receive the incoming material adjacent the lower extremity of the casing and elevate the same to the uppermost extremity of the heated surface.

3. In an oil drying apparatus, the combination with a closed casing being provided with an inner heated surface around the vertical sides thereof, an inlet for the materials to be dried, an outlet for vapor and condensation, means for discharging the dried oil, and means for presenting the incoming material to the heated surface adjacent the topmost portion thereof comprising a conveyer blade adapted to receive the incoming material adjacent the lower extremity of the casing and elevate the same to the uppermost extremity of the heated surface, said conveyer blade being mounted to rotate on a vertical axis within the casing.

4. In an oil drying apparatus, the combination with a relatively closed casing provided with an inner heated surface, a receptacle for incoming material in the bottom of the casing, the said receptacle having its side walls of a smaller diameter than the diameter of the walls of the casing, a heating surface adjacent the interior of the walls of the casing above the said receptacle, said heating surface being so positioned that dried oil will by gravity be directed between the walls of the receptacle and the walls of the casing, and means for conducting the dried oil from the casing.

5. In an oil drying apparatus, the combination with a relatively closed casing provided with an inner heated surface comprising a steam coil extending around the inner periphery of the casing and a steam coil adjacent the bottom of the casing, there being an inlet for the materials to be dried adjacent the bottom of the casing and an outlet for vapor and condensation adjacent the top of the casing, means for discharging the dried oil from adjacent the bottom of the casing, and means for presenting the incoming material in a thin film to the said steam coil around the inner periphery of the casing.

6. In an oil drying apparatus, the combination with a closed casing being provided with an inner heated surface around the vertical sides thereof, an inlet at the bottom of the casing for the materials to be dried, an outlet for vapor and condensation adjacent the top of the casing, means for discharging the dried oil, and means for presenting the incoming materials to the heated surface adjacent the topmost portion thereof comprising a conveyer blade adapted to revolve around a relatively vertical axis and being adapted to receive the incoming materials adjacent the lower extremity of the casing and present the same to the heated surface in a thin film at the uppermost extremity of the heated surface.

7. In an oil drying apparatus, the combination with a closed casing being provided with an intake for the materials to be dried, an outlet for air and gases at the top of the casing, and means adjacent the bottom of the casing for discharging dried oil, a heating surface extending around the vertical walls of the casing and across the bottoms thereof, and means for conveying the materials to be dried from adjacent the heating surface at the bottom of the casing to the uppermost extremity of the heating surface and presenting the same thereto in a thin film.

8. In an oil drying apparatus, the combination with a closed casing provided with an inner heated surface, an inlet for the materials to be dried, an outlet for vapor and condensation, means for discharging the dried oil, a heating surface in the bottom of the closed casing comprising a steam coil, and means for conveying the materials to be dried from the said steam coil in the bottom of the casing to the uppermost extremity of the walls of the casing and presenting the same thereto in a thin film, the said conveying means comprising a channeled member mounted to rotate around the vertical axis within the casing.

9. In an oil drying apparatus, the combination with a stationary cylindrical casing provided with an intake in the bottom thereof for the materials to be dried, a steam coil in the bottom of the casing and a steam coil extending in a vertical direction around the vertical walls of the casing, conveying means within the casing adapted to receive the incoming materials adjacent the said steam coils in the bottom of the casing and conveying the same to the upper extremity of the steam coils around the vertical walls of the casing, a shaft rotatably mounted within the casing for drying the said conveyer, an open tubular air shaft surrounding the said vertical shaft and adapted to rotate therewith, there being an outlet for air and gases adjacent the top of the casing, and means for discharging the dried oil from the casing.

10. In an oil drying apparatus, the combination with a relatively closed casing provided with an inner heating surface, a receptacle for incoming material in the bottom of the casing, the said receptacle having its side walls separated from the walls of the casing whereby an annular space is provided between the casing walls and the walls of the receptacle, a steam heated coil suspended within the casing above the said annular space between the receptacle and the wall of the casing whereby material presented to the steam coil and dropping therefrom may be collected within the said space between the receptacle and the casing, means for conveying the dried oil from the casing, and means for removing air and gases from within the casing.

11. In an oil drying apparatus, the combination with a closed casing provided with an inner heated surface, there being an inlet for the materials to be dried and an outlet for vapor and condensation in said casing, means for discharging the dried oil from the casing, means for presenting the incoming material to the heated surface, and a blower rotatably mounted within and inclosed by the casing adapted to move the air in a continuous current over the heated surface within the casing.

12. In an oil drying apparatus, the combination with a closed casing provided with an inner heated surface, an inlet for the materials to be dried, an outlet for vapor and condensation, means for discharging the dried oil, means for presenting the incoming materials to the heated surface, comprising a channeled member provided with a scoop or receiving blade at its lower extremity, the said channeled members being rotatably carried on a vertical shaft within the casing, a fan blade carried by the said vertical shaft, and means for imparting rotation to said shaft.

13. In an oil drying apparatus, the combination with a casing of a heated surface in said casing, means for presenting materials to be dried to said heated surface within the casing, said last mentioned means being carried on a vertical rotatable shaft and supported by radial arms screw threaded at their inner extremities into spiders sleeved on said rotatable shaft, the said arms being screw threaded into said spiders with their innermost extremities in engagement with the said rotatable shaft in order to secure said spiders and arms in fixed relation to said rotatable shaft.

14. In an oil drying apparatus, the combination with a closure being provided with a heated surface along the vertical walls thereof, an intake for the materials to be dried, an outlet for vapors and moisture adjacent the top of the closure, a conical shaped flange secured to the top of the closure adjacent the said discharge opening, a peripheral conical flange secured to the interior walls of the casing and spaced apart from the first said conical flange to provide an outlet between said flanges leading to the said discharge opening, the said peripheral flange on the interior wall of the casing being adapted to form a trough venting through the said discharge opening, and means for presenting materials to be dried to the said heated surface and for passing an air blast through the said casing and through the said discharge outlet.

15. In an oil drying apparatus, the combination with a casing being provided with an intake for materials to be dried and an outlet for vapors and moisture, means for presenting materials to be dried to the said heated surface and for passing a blast of air through the said casing over the said heated surface and out through the said discharge opening, a receptacle in the bottom of the casing spaced apart from the walls of the casing to provide a peripheral chamber between the said receptacle and the casing, and an overflow pipe leading from the said peripheral chamber and being provided with a trap elevated above the plane of the said discharge opening whereby the dried oil within the said peripheral chamber may be retained at a predetermined level.

16. In an oil drying apparatus, the combination with a closed casing being provided with means for separating moisture from oils and the like, a peripheral chamber in the bottom of the casing adapted to collect the dried oil, an outlet leading from the said peripheral chamber to a closed receptacle, the mouth of the said outlet within the closed receptacle being above the plane of the outlet leading from the peripheral chamber whereby the dried oil may be retained in a predetermined level within the peripheral chamber of the casing, and a discharge pipe leading from the closed receptacle.

17. In combination with a heated surface, means for admitting upon it the combined oil, animal fat and water, a trap to separate liquid oil from foam placed at the terminal of flow and means for returning the undried oil in form of foam back to the heated surface.

In testimony whereof I have signed my name to this specification, in the presence of two subscribing witnesses, on this 31st day of August A. D. 1911.

WILLIAM L. MORRIS.

Witnesses:
J. W. BURROWS,
CHAS. M. SMITH.